United States Patent
Murgatroyd et al.

(10) Patent No.: US 7,505,415 B2
(45) Date of Patent: Mar. 17, 2009

(54) PERFORMANCE MONITORING IN A COMMUNICATIONS NETWORK

(75) Inventors: Colin Murgatroyd, Berkhamsted (GB); Chris Ramsden, Hertford (GB)

(73) Assignee: Nortel Networks Limited, St. Laurent, Quebec (CA)

(*) Notice: Subject to any disclaimer, the term of this patent is extended or adjusted under 35 U.S.C. 154(b) by 961 days.

(21) Appl. No.: 10/768,787

(22) Filed: Jan. 30, 2004

(65) Prior Publication Data

US 2005/0169184 A1 Aug. 4, 2005

(51) Int. Cl.
*H04L 12/26* (2006.01)
*G06F 11/00* (2006.01)

(52) U.S. Cl. .............. 370/241; 370/244; 370/245; 709/224; 369/30.21; 714/48

(58) Field of Classification Search ............ 370/242, 370/244, 245, 248, 252; 714/25, 48; 398/25, 398/27; 709/224; 369/30.21
See application file for complete search history.

(56) References Cited

U.S. PATENT DOCUMENTS

| | | | |
|---|---|---|---|
| 5,796,633 A * | 8/1998 | Burgess et al. ........... 702/187 |
| 6,301,336 B1 * | 10/2001 | Branton et al. .......... 379/29.01 |
| 6,453,346 B1 * | 9/2002 | Garg et al. ................. 709/224 |
| 7,032,139 B1 * | 4/2006 | Iryami et al. ............... 714/704 |
| 7,197,559 B2 * | 3/2007 | Goldstein et al. .......... 709/224 |
| 2003/0028631 A1 * | 2/2003 | Rhodes ..................... 709/224 |
| 2003/0065986 A1 * | 4/2003 | Fraenkel et al. ............ 714/47 |
| 2003/0088542 A1 * | 5/2003 | McGee et al. ................ 707/1 |
| 2004/0098363 A1 * | 5/2004 | Anglin et al. ................ 707/1 |

* cited by examiner

*Primary Examiner*—Chi H Pham
*Assistant Examiner*—Ahmed Elallam
(74) *Attorney, Agent, or Firm*—Barnes & Thornburg LLP

(57) ABSTRACT

A method of performance monitoring and a processor for performance monitoring in a communications network are provided. A signal is monitored over time by allocating a current signal quality characterization to the signal, selected from at least two such signal quality characterizations, such as perfect time, errored time and unavailable time. A plurality of time intervals making up a continuous succession of such time intervals are identified, such that a current time interval is terminated and a next time interval is initiated each time the signal quality characterization allocated to the signal changes. Then, a record of each identified time interval is generated and can be used to generate a performance log. Selected records may be manipulated to reduce the amount of memory required to store the records while intelligently degrading their accuracy.

37 Claims, 4 Drawing Sheets

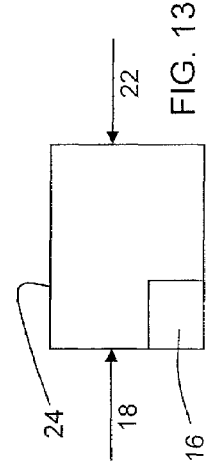
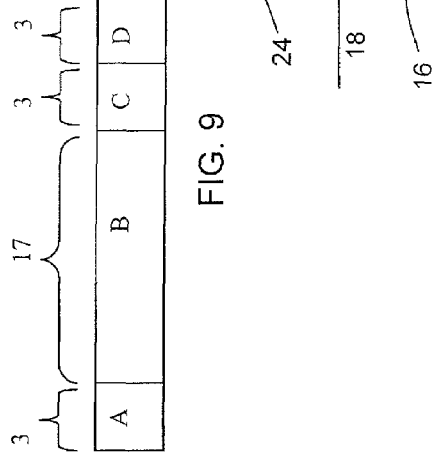

PERFORMANCE MONITORING IN A COMMUNICATIONS NETWORK

FIELD OF THE INVENTION

This invention relates to a method of and a processor for monitoring the performance of a communications network in particular so as to generate a performance log with a rich information content.

BACKGROUND OF THE INVENTION

A communications network generally comprises a plurality of network elements connected by links, for example optical links or radio links. The communications network may carry many communications paths between end users of the network, with a plurality of communications paths multiplexed onto single links of the network. A communications network is generally managed by an operator at an Operations Centre (OC) site remote from the communications network through a Data Communications Network (DCN) and performance monitoring of the links of the network may be carried out at elements of the network with the elements of the network reporting the results of performance monitoring on the DCN. In this way faults on the links can be identified at the OC by an operator thereof and remedial action, such as restoration activity or initiation of repair of the faulty link, may be taken.

Performance monitoring may also be undertaken for the communications paths carried by the network, for example at a terminal network element of a communications path. Where many communications paths are multiplexed onto a link of the network, when a fault occurs on the link of the network, faults may occur on all of the paths multiplexed on that link. If path alarms are raised when a path fault occurs, then a fault on a link will generate many such alarms. This results in alarm floods or surges when a fault occurs on the network and this can impact the DCN and impair the performance of management platforms, such as a management platform responsible for processing alarm reports.

However, alarms from surveillance of communications paths are important for informing a service user and/or a service provider when a service goes down and when a service comes up again. Such alarms are of use when a specific action is required to be taken when a service goes down or up. An, examples of this might be the service provider sending an E-mail to the service user to inform them of when a service goes up and/or down.

One way of overcoming the problem of alarm surges is to turn off reporting of some or all alarms arising from performance monitoring of communication paths. However, there is still a need for a historical log of defects on the communications paths so as to provide after the fact information about the impact of network faults on the communications paths as an aid to trouble shooting. Primarily, this log is used by the operator/carrier to provide a history of the quality of service (QOS) provided to justify charges for use of the service.

Traditionally, such historical logs are stored within the network on a network element where it is recorded in Performance Monitoring (PM) reports or in text logs, which can be inspected later.

Traditionally, performance monitoring has monitored the incoming signal continuously looking for bit errors in each successive one second time interval over which the signal is received. Where less than 30% of bits in a second are detected as bit errors, an Errored Second (ES) is detected. Where 30% or more of the bits received in one second are detected as bit errors a Severely Errored Second (SES) is detected. Where ten successive SESs occur an Unavailable Time (UAT) is detected. In a 24 hour period data is collected for 96 15 minute reports and one 24 hour report. In relation to a 15 minute report, over a 15 minute period, seconds of received signal containing errors are counted as ES, SES or UAT, so that at the end of each 15 minute period a 15 minute report is generated and stored as a count of ES, SES and UAT seconds within the 15 minute period. In addition a 24 hour report is generated and stored as a count of ES, SES and UAT seconds within a 24 hour period. This performance monitoring process is described in various standards, for example:

ITU-T Recommendation G.826 (2002), End-to-end error performance parameters and objectives for international, constant bit-rate digital paths and connections;

ITU-T Recommendation G.828 (2000), Error performance parameters and objectives for international, constant bit-rate synchronous digital paths (See also Corrigendum 1); and ITU-T Recommendation G.8201 (2003), Error performance parameters and objectives for multi-operator international paths within Optical Transport Network (OTN).

Whilst this process produces a fairly succinct log of defect activity within a given period, there are a few shortcomings.

Firstly, the 15 minute and 24 hour reports are still collected even if there are no defects for the period. So over an error free period a total of 96 15 minute reports and 1 24 hour report will be collected. In this circumstance the PM report log is not succinct.

Secondly, if over a period a small number of defects are detected, it is not easy to see at a glance what periods of continuous defect free time were enjoyed by a given path. In this case the 24 hour report will contain a small number of defects as will some of the 15 minute reports so that continuous defect free time has to be pieced together from defect free 15 minute reports. The 24 hour report does not have the granularity required, although it is concise, given the period it covers. The 15 minute reports, have improved granularity, although not sufficient to determine exactly when a service may have failed. The 15 minute reports have the added disadvantage that it requires larger amounts of memory to store them.

Thirdly, the precise time that a defect occurred is not known beyond the granularity of the report. For example if a 15 minute report counts several ESs, it is not known when in the 15 minute period they occurred or whether the ESs occurred together or at different times. Precise time can be important in assessing whether a service outage breaches the conditions set out in a service level agreement.

In addition it is known to make a log of intervals of UAT, for example as a start time and a finish time for an interval of UAT. G.826 (referenced above) states that a period of unavailable time begins at the onset of ten consecutive SES events. These ten second are considered to be part of unavailable time. A new period of available time begins at the onset of ten seconds of consecutive non-SES events. These ten seconds are considered to be part of available time.

As an alternative to the PM report scheme described above a text log can be utilised in which defects on the incoming signal are recorded as a simple time-stamped textual log, indicating the defect detected/raised. This preserves the detail of the defect but is associated with different problems.

Firstly, logs are typically stored in non-volatile memory so that the log can be recovered even after a power loss on a network element. The available memory for logs is typically limited within a network element. A goal is that it should be possible to store 24 hours of defect activity in a log. The amount of memory required to store 24 hours of defect activity varies dependant on the stability of the network. However, it is generally accepted that log memory is unlikely to last 24 hours before information is lost by new text log entries overwriting old ones.

Secondly, when troubleshooting a rapidly toggling defect, a log containing hundreds (even thousands) of alternating defect raised, defect cleared entries does not help in detailing service performance. The likelihood is that entries in the log of important information, for example indicating the first onset of the defect, will be lost as a result of new text log entries overwriting old ones.

The present invention proposes a method of recording historical service quality information, that provides useful, precise information on service quality, yet is succinct enough to be stored using the limited available memory normally allocated on a network element for log data.

SUMMARY OF THE INVENTION

The present invention relates generally to collecting performance information as a sequence of records each relating to one of a continuous sequence of time intervals of differing length, with each time interval defined as a time during which a monitored signal has a constant quality.

According to a first aspect of the present invention there is provided a method of performance monitoring in a communications network, comprising;
  monitoring a signal over time by allocating a current signal quality characterization to the signal, selected from at least two such signal quality characterizations;
  identifying a plurality of time intervals making up a continuous succession of such time intervals, such that a current time interval is terminated and a next time interval is initiated each time the signal quality characterization allocated to the signal changes; and
  generating a record of each identified time interval.

According to a second aspect of the present invention there is provided a processor for carrying out performance monitoring in a communications network and which is configured for carrying out the following instructions;
  monitor a signal over time by allocating a current signal quality characterization to the signal, selected from at least two such signal quality characterizations;
  identify a plurality of time intervals making up a continuous succession of such time intervals, such that a current time interval is terminated and a next time interval is initiated each time the signal quality characterization allocated to the signal changes; and
  generate a record of each identified time interval.

According to a third aspect of the present invention there is provided control logic for carrying out performance monitoring in a communications network and configured for carrying out the following instructions;
  monitor a signal over time by allocating a current signal quality characterization to the signal, selected from at least two such signal quality characterizations;
  identify a plurality of time intervals making up a continuous succession of such time intervals, such that a current time interval is terminated and a next time interval is initiated each time the signal quality characterization allocated to the signal changes; and
  generate a record of each identified time interval.

The processor or the control logic may be located in a network element of the communications network at any point along a communications path. Also, the processor or control logic may be for monitoring a communications path and may be located in a network element of the communications network, which network element terminates the communications path. A communications path can be monitored not just at path termination points, but also at intermediate points along the path.

According to a fourth aspect of the present invention there is provided a network element for carrying out performance monitoring in a communications network comprising;
  processing means for monitoring a signal over time by allocating a current signal quality characterization to the signal, selected from at least two such signal quality characterizations; and
  processing means for identifying a plurality of time intervals making up a continuous succession of such time intervals, such that a current time interval is terminated and a next time interval is initiated each time the signal quality characterization allocated to the signal changes; and
  processing means for generating a record of each identified time interval.

The network element may be for monitoring a communications path and may be located in the communications network, at a termination of the communications path.

The present invention provides an efficient way of recording performance information, by generating records relating to meaningful time intervals, as opposed to arbitrary time intervals, such as 15 minute reports. The time intervals are defined as intervals over which a signal is received with the same quality characterization. So, for example, an extensive period of several defect free hours, occupies only one record. This means that more of the available memory is available for accurately storing data about defects. Also, because the records relate to continuous successions of time intervals, the records are provided in a format that can be easily manipulated so as to reduce the amount of memory required to store the records, while maintaining a high level of record accuracy.

The records may be used for generating a performance log, for example in a limited pre-determined amount of memory available in a network element of the communications network. The monitoring of the signal may occur over successive log periods and a performance log may be generated using the records for each log period. A typical log period might be 24 hours. The performance log may be generated from records stored in accordance with the succession of the time intervals to which the records relate. This makes a performance log chronological and so can make it easier to interpret.

The time intervals may be identified by:
  initiating a first time interval;
  terminating the first time interval and initiating a next time interval when the signal quality characterization allocated to the signal next changes; and
  for subsequent changes in the allocated signal quality characterization of the signal, terminating the current interval and initiating a next interval.

The signal quality characterizations may be any measure of signal quality. In particular, the characterizations may include at least one of the following:
  Perfect Time (PT) Interval, which is allocated to the signal where no errors are detected on the signal;
  Errored Time Interval, which is allocated to the signal where errors are detected on the signal in a unit time in insufficient numbers to make a service carried by the signal unavailable. An Errored Second (ES), is an example of an Errored Time Interval;
  Severely Errored Time Interval, which is allocated to the signal where errors are detected on the signal in a unit time in sufficient numbers to make a service carried by the signal unavailable. A Severely Errored Second (SES), is an example of a Severely Errored Time Interval;

Unavailable Time Interval (UAT), which is allocated to the signal where a service carried by the signal is unavailable (for example, where a sustained sequence of SESs are allocated to the signal); and Poor Time Interval (PrT), which is allocated to the signal where a sequence of at least two of the above characterizations are detected on the signal.

The record for each interval will, as a minimum, store the length of the interval and the signal quality characterization allocated for the interval. Additional data may be included in a record.

One advantage of the records generated according to the present invention is that they can be easily manipulated to reduce the memory used while maintaining a high level of record accuracy. For example, a performance log may be generated by manipulating selected records to reduce the amount of memory required to store the records, whilst intelligently degrading their accuracy. This may be achieved by selecting sets of records corresponding to continuous successions of time intervals, and merging the selected sets to form a merged record. The merged record then relates to a longer time interval of a duration equal to the sum of the intervals for the merged records. In some embodiments of the present invention, it may be that Poor Time is only used to characterize a record which results from such a manipulation of pre-existing records, for example for a merged record resulting from the merger of a plurality of pre-existing records.

In one embodiment, some records may be designated as primary records and others as secondary records, then sets of secondary records corresponding to continuous successions of time intervals may be selected and merged to form a merged record. In this case, the primary records will be records, which are considered to be important enough to be left in a completely accurate form. The primary records may be designated as one or more sets of the longest records having a selected quality characterization. For example, the N longest intervals of PT and the N longest intervals of UAT. The primary records, unmerged secondary records and merged records may then be stored in a performance log according to the succession of their associated time intervals. The secondary records may be defined to be those records which are not primary records.

In one embodiment of the present invention sequences of secondary records located between two primary records may be selected for merging. This may be an automatic process in which case as soon as such a sequence of secondary records are generated they are automatically merged. Alternatively, such sequences of secondary records may be earmarked for merging, but only merged when the available memory becomes close to being full or when processing time becomes available.

Secondary records may be designated as one or more of the following:
as records representing the shortest intervals of time; and
as records corresponding to the highest densities of continuous successions of time intervals.

By merging the shortest records, or sets of records that change quickly over a short period of time, the records will remain completely accurate for a high proportion of the time over which the signal is monitored.

The amount of memory required to store the records may be monitored and when the amount of memory reaches a predetermined limit, records corresponding to continuous successions of time intervals may be selected and merged to form a merged record so as to reduce the amount of memory required to store the records. This can be used to limit the amount of memory required to store records for a log period (typically 24 hours) to a predetermined maximum.

According to a fifth aspect of the present invention computer executable software code stored on a computer readable medium may be provided for making a computer execute the performance monitoring described above.

According to a sixth aspect of the present invention, a programmed computer, which stores computer executable program code may be provided for making the computer execute the performance monitoring described above.

According to a seventh aspect of the present invention a computer readable medium having computer executable software code stored thereon may be provided which code is for making a computer execute the performance monitoring described above.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

In order that the present invention is more fully understood and to show how the same may be carried into effect, reference shall now be made, by way of example only, to the Figures as shown in the accompanying drawing sheets, wherein:

FIG. 4 shows schematically the data stored in a partially full performance log when that part of the signal represented in FIG. 3 has been monitored by a processor of FIG. 2 or 13;

FIG. 5 shows schematically the data stored in a complete performance log when the signal represented in FIG. 3 and completed by 37,614 seconds of perfect time (PT) has been monitored by a processor of FIG. 2 or 13;

FIG. 6 shows schematically the data stored in a performance log when the signal represented in FIG. 3 and followed by a 2500 s interval of perfect time (PT) results in the merging of previously recorded records into poor time (PrT) in accordance with one aspect of the present invention to ensure that only the five longest records of perfect time are recorded;

FIG. 7 shows schematically the data stored in a performance log when the signal represented in FIG. 3 and followed by a 2500 s interval of perfect time (PT) results in the merging of previously recorded records into poor time (PrT) in accordance with one aspect of the present invention to ensure that the last five records of the performance log remain empty;

FIG. 8 shows a similar set of data as for FIG. 7 but with different previously recorded records selected for merging;

FIG. 9 shows a sample of a record indicating which bits of the record are used to store which data;

FIG. 13 shows an alternative embodiment of a processor for carrying out a performance monitoring process according to the present invention.

DETAILED DESCRIPTION OF PREFERRED EMBODIMENTS

There will now be described by way of example the best mode contemplated by the inventor for carrying out the invention. In the following description, numerous specific details are set out in order to provide a complete understanding of the present invention. It will be apparent, however, to those skilled in the present invention may be put into practice with variations of the specific.

Figure 1:
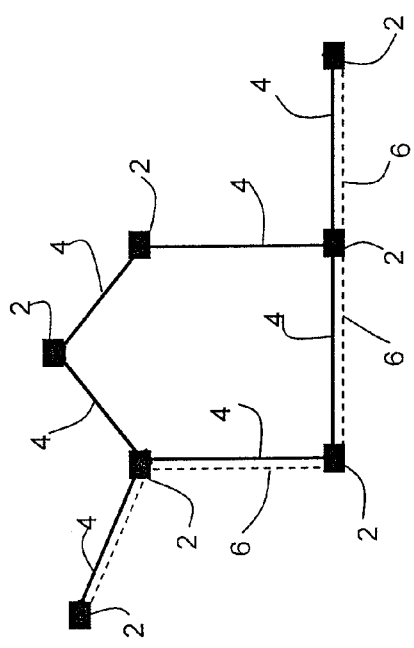
FIG. 1 shows schematically a part of a communications network in relation to which performance monitoring according to the present invention is performed.

FIG. 1 shows a portion of a communications network comprising a plurality of network elements (2, 2') connected by communication links (4). The links may comprise radio frequency links, optical links or electrical links for carrying signals between the network elements. The communication links (4) shown schematically in FIG. 1 may carry signals between network elements in both directions. The communications network is managed by a network management system (not shown) with which some or all of the network elements (2, 2') communicate. Many signals may be multiplexed onto each link (4) so that the communications network can carry a plurality of communications paths providing services to end users of the network. One such communication path (6) is shown in dotted lines and extends between terminal network elements (2').

Figure 2:
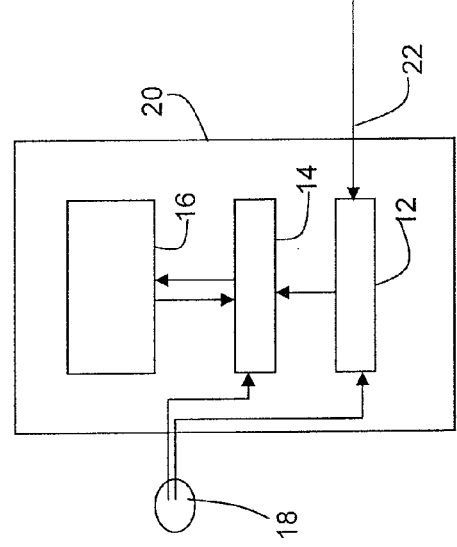
FIG. 2 shows schematically a processor which may be incorporated in a network element of the network of FIG. 1 for carrying out performance monitoring and storing a performance log in accordance with the present invention.

Consider an example in which performance monitoring of the communications path (6) is carried out by a data processing arrangement or processor (20) shown in FIG. 2 and incorporated at one of the terminal network elements (2') shown in FIG. 1. An incoming signal to the terminal network element (2') on the communications path (6) is carried by communication link (4) and input into an interface of the terminal network element (2'). The interface processes the incoming signal to recover the signal in a suitable format for processing by the network element (2'), for example in a central processor. The recovered signal (22) is input into a bit error detector (12) of the data processing arrangement (20) of FIG. 2. The bit error detector (12) detects bit errors in the incoming signal over successive 1 second intervals and outputs signals at the end of each second to a performance monitoring (PM) processor (14). The bit error detector is controlled by a clock signal (18), which may be provided by the network element (2'), although alternatively the clock signal may be derived externally to the network element (2'). When no bit errors are detected in a one second interval a null signal is output by the detector (12) to the PM processor (14) at the end of that second. When bit errors are detected for less than 30% of a second, at the end of that second the detector (12) outputs an ES signal to the PM processor (14) indicating that an Errored Second has been detected for the incoming signal. When bit errors are detected for more than 30% of a second, at the end of that second the detector (12) outputs an SES signal to the PM processor indicating that a Severely Errored Second has been detected for the incoming signal. In FIG. 2, the data processing arrangement (20) is shown as separate hardware elements, such as control logic, for the detector (12) and PM processor (14). However, in practice a single data processor or computing device (24), suitably programmed in accordance with software code, might be used to carry out the functions of the bit error detector (12) and PM processor (14). The processor (24) would receive the incoming signal (22) and the clock signal (18), as shown in FIG. 13. In fact the processor (24) most likely to be utilized is one which is integral to the network element (2'), again suitably programmed in accordance with software code. The processors (20, 24) also comprise a memory (16). Similar, performance monitoring may be carried out at network elements (2) which are not terminal elements for a communications path.

Figure 3:
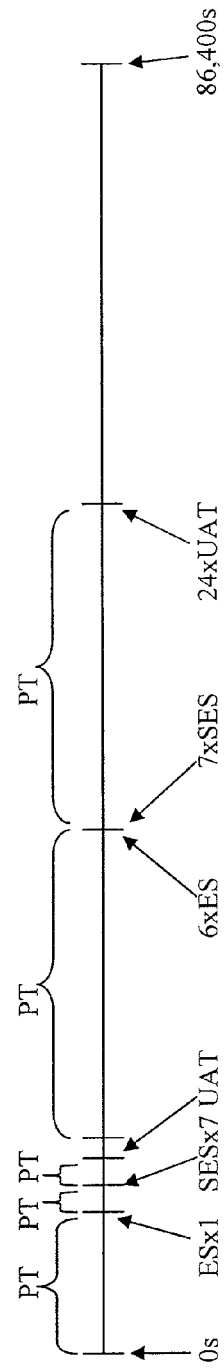
FIG. 3 shows a time line showing the quality of a signal over sequential intervals of time in part of a 24 hour period as an example of a signal received by a processor of FIG. 2 or 13.
Figure 10:
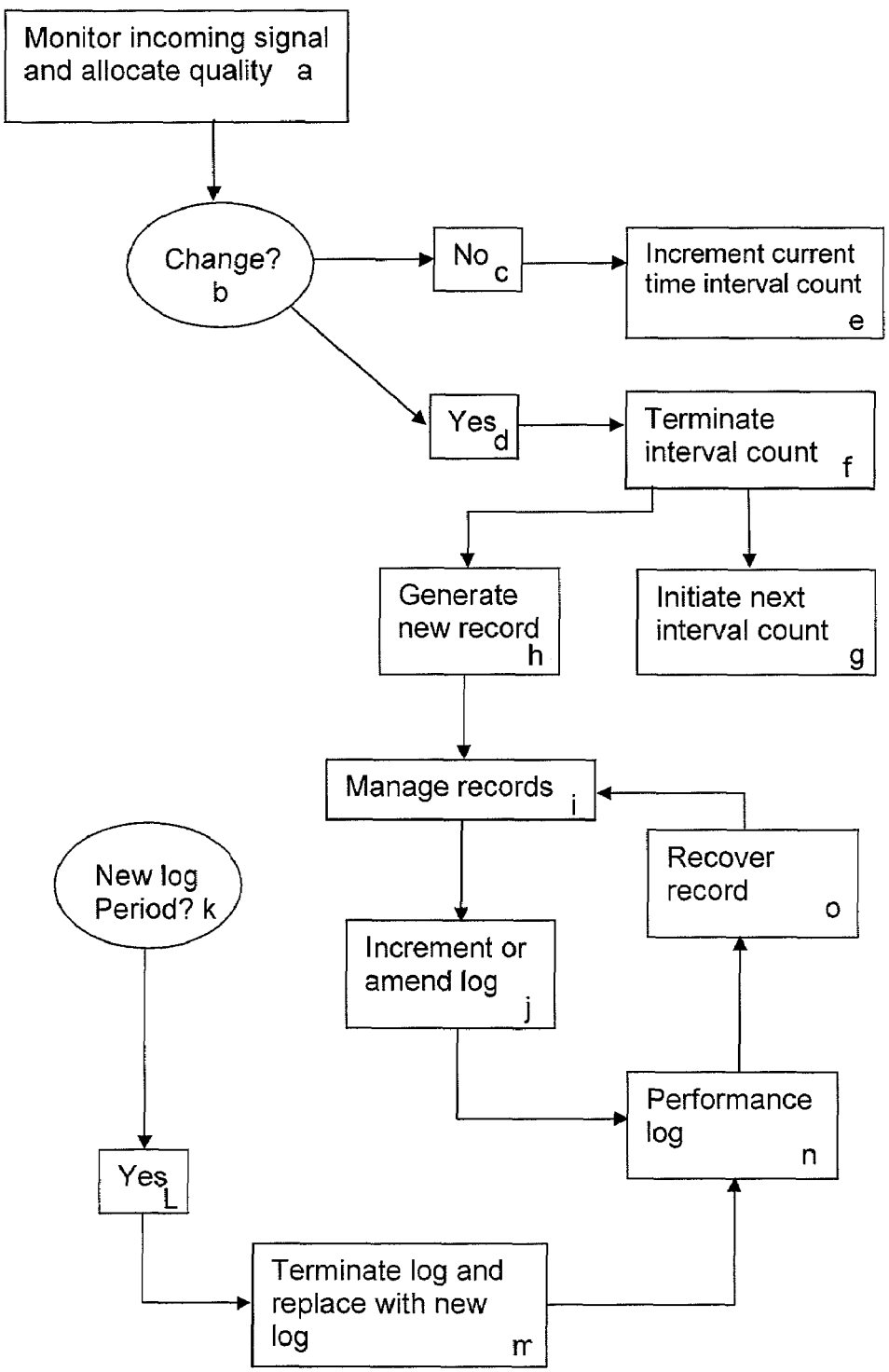
FIG. 10 shows a flow diagram of a performance monitoring process according to one aspect of the present invention which may be carried out by the processor of FIG. 2 or FIG. 13.

At the beginning of a new monitoring period, for example a 24 hour (86,400 s) monitoring period, shown as time line in FIG. 3, the PM processor (14), which is controlled by the same clock signal as the detector (12), generates a new performance log in the memory (16) of the network element (2') [FIG. 10, boxes k to m], for example, by overwriting entries in the old performance log. The performance log [FIG. 10, box n] stored in memory (16) at a time just after 48,787 seconds into the 24 hour period represented in FIG. 4 will store the information set out in FIG. 4.

In accordance with the FIGS. 3 and 4 example, an initial interval of 6417 seconds elapses in which the incoming signal carries no errors, so that the bit error detector (12) detects no errors. Thus, the detector outputs a null signal to the PM processor (14) at the end of each of the 6417 seconds and the PM processor counts these. In the $6418^{th}$ second the signal carries less than 30% bit errors and an ES is detected and so the detector (12) outputs an ES signal to the PM processor (14) and the PM processor initiates a count of ES signals. In response to receiving the first ES signal, the PM processor sends a first record to the newly created performance log in the memory (16). The first record comprises a characterization of signal quality, in this case PT, and a time interval, in this case 6417, as counted by the PM processor (14), which record is shown in the top row of FIG. 4.

In the next second the incoming signal carries no bit errors and so the detector (12) outputs a null signal to the PM processor (14). In response to this the PM processor initiates a count of null signals and sends a second record to the newly created performance log in the memory (16). The second record comprises a characterization of signal quality, in this case ES, and a time interval, in this case 1, as counted by the PM processor, which record is shown in the second row of FIG. 4.

The incoming signal then undergoes 998 seconds with no bit errors, so that no bit errors are detected by the bit error detector (12). Accordingly, the detector outputs a sequence of 998 null signals (one at the end of each second), which are counted by the PM processor (14). Then in the $7417^{th}$ second the incoming signal carries bit errors for more than 30% of the second and so an SES is detected and the detector outputs an SES signal to the PM processor (14). In response to this the PM processor initiates an SES signal count and sends a third record to the newly created performance log in the memory (16). The third record comprises a characterization of signal quality, in this case PT, and a time interval, in this case 998, as counted by the PM processor, which record is shown in the third row of FIG. 4. In the following 6 seconds of incoming signal SESs are detected and so, for the following 6 seconds an SES signal is sent to the PM processor (14) from the detector (12). The PM processor counts the SESs signal from the detector (12). In the following second no error is detected and so a null signal is sent to the PM processor. In response to the null signal in the following second the PM processor initiates a count of null signals and determines that there has been a series of seven SESs. In response to this the PM processor sends a fourth record to the performance log in the memory (16), which record comprises a characterization of signal quality, in this case SES, and a time interval, in this case 7, which record is shown in the fourth row of FIG. 4.

There then follows a time interval of 1002 seconds with no further error detected by the bit error detector (12). Then in the 8426$^{th}$ second a SES is detected and the detector outputs an SES signal to the PM processor (14). In response to this the PM processor (14) sends a fifth record to the newly created performance log in the memory (16). The fifth record comprises a characterization of signal quality, in this case PT, and a time interval, in this case 1002, which record is shown in the fifth row of FIG. 4. In the following 334 seconds of incoming signal SESs are detected and so, for the following 334 seconds an SES signal is sent to the PM processor (14) from the detector (12). The PM processor counts the SES signal from the detector (12) and once more than 10 successive SES signals have been received the PM processor characterises the count as UAT until 10 successive signals which are not SES signals are received from the detector (12). On the following 10 seconds no further SESs are detected on the incoming signal. In response to this the PM processor sends a sixth record to the performance log in the memory (16), which record comprises a characterization of signal quality, in this case UAT, and a time interval, in this case 334, which record is shown in the sixth row of FIG. 4.

If the performance log has space for Q records, then for a stable network, which should normally be operating, the number of records generated by the processor (20, 24) in a 24 hour period should be less than Q. The number of records Q making up a full log may for example be of the order of 32. For generally stable networks, the above process carries on for the 24 hour period and an accurate record of the sort shown in FIG. 5, giving accurate characterizations for successive time intervals of an incoming signal over a 24 hour period is achieved. In the FIG. 5 example, after the 334 seconds of UAT the signal quality of the incoming signal is recorded sequentially as 15664 seconds of PT, 6 seconds of ES, 7 seconds of SES, 24326 of PT, 24 seconds of UAT and 37,614 seconds of PT, which latter completes the 86,400 seconds making up the 24 hour period of the current performance log. Then the next 24 hour time period begins and a new 24 hour performance log is generated [FIG. 10, boxes k to m].

To summarise, in relation to FIG. 10, the incoming signal (22) is monitored [box a] by processor (20, 24). The processor (20, 24) generates a signal from this monitoring process, for example per unit time, representative of the currently detected quality characterization of the incoming signal. The time interval count is representative of the duration of the current interval and in the example above, is the count of successive signals representing the currently detected quality characterization. A decision is made by the processor (20, 24) each time a signal representative of the quality characterization is generated [box b] as to whether the signal quality characterization has changed since the last such signal was generated. If the decision is 'no—the signal quality has not changed' [box c], then the processor (20, 24) increments the current interval count by the unit time [box e]. If the decision is 'yes—the signal quality has changed' [box d], then the processor (20, 24) terminates the current interval count [box f], initiates a new time interval count [box g] and generates a new record [box h] for the just terminated interval. The processor (20, 24) records new records in a performance log [box n] either in an unamended form or in an amended form, via a record management step [box i] and an increment or amend log step [box j] which are described in more detail below, in particular, in relation to FIGS. 11 and 12. In certain circumstances, the processor may manage selected new records and/or selected records recovered from the performance log [step o] so as to manipulate the selected records to reduce the amount of memory required to store the selected records in the performance log while degrading the accuracy of the data stored in the selected records by only a small amount.

Alternatively, it may be that the processor (20, 24) generates a signal representing the quality characterization of the incoming signal only when that quality changes. In this case the processor (20, 24) measures the time between generation of successive ones of these signals as the duration of a time interval.

The processor (20, 24) also monitors the performance log period, which is typically 24 hours long. After each log period, the processor (20, 24) determines that a new log period is to be started [boxes k and l] and terminates the current log and replaces the current log with a new and empty log [box m]. For example, entries in the new log may overwrite entries in the old log. When it is determined that a new log period is to be started, this automatically terminates the current interval count to generate the last record for the old performance log and will automatically initiate the first interval count of the new performance log. The step of terminating the current log may include copying the current log and sending the copy to another location.

Where the network is unstable, using the process described above, the PM processor could easily generate more than Q records in the 24 hour period. One aim of the present invention is to provide a performance log, which is as accurate as possible, subject to the requirement that the memory required for storing the record for a 24 hour period is limited to a predetermined amount. According an embodiment of the present invention, the accuracy of information stored in the performance log is degraded in an intelligent manner, so as to limit the size of the record, while still providing a good indication of performance.

A first example of limiting the size of the performance log is to limit the number of intervals of PT to a set number N, for example 5 and to limit the number of intervals of UAT to a set number N, for example 5. Another example would be to limit to 10 periods of PT and 10 periods of UAT. The limit of the number of periods of PT and UAT is dependent on the maximum number of records that can be stored in the performance log for a 24 hour period. The intervals of PT or UAT selected to make up said 5 intervals are selected to be the five longest intervals of PT or UAT and are designated as intervals associated with primary records. In this first example, the performance log is filled up as described above until a sixth interval of UAT or PT is detected. As soon as such a sixth interval is detected, a merging of existing records in the log into a record characterised as Poor Time (PrT) is performed.

In the example of FIGS. 3 and 4, consider the case where after the 24 seconds of UAT at the end of the record in FIG. 4, a further, sixth, interval of 2500 s of PT is detected, followed by an interval of 6 s of ES. Because of the limit on the number of intervals of PT, which can be stored in the performance log, as there are already 5 intervals of PT stored in the performance log represented by FIG. 4, the PM processor (14) cannot store this latest interval of 2500 s PT in the performance log, when the ES signal is received from the detector (12) marking the end of the 2500 s interval of PT.

In the present example, the records selected for merging (designated as secondary records) are selected to include that record of the same quality as said sixth interval with the shortest duration and its adjacent record with the shortest duration. In the present example there are 5 intervals of PT stored in the performance log represented in FIG. 5, plus the latest interval of PT just recorded by the PM processor. The ES record of PT having the shortest duration is that in the third row of FIG. 3 (duration=998 s) and the adjacent record with the shortest duration is that in the second row of FIG. 3 (duration=1 s). Thus, using this criteria, the records in the second and third rows of the performance log would be designated as secondary records and selected for merging into a poor time record. In this case, on receiving the first ES signal from the detector (12) marking the end of the 2500 s interval of PT, the PM processor extracts the following two records from the second and third rows of the performance log represented in FIG. 3:

Duration=1; Quality=ES;

Duration=998; Quality=PT; and

And merges them to form a single merged record, formatted as follows:

Duration=999; Quality=PrT; % PT=99.9; % UAT=0 where
- Duration=the number of seconds making up the interval=the sum of the durations of the records which are merged to form the merged record;
- Quality=the quality characterization of the interval;
- % PT=the percentage of seconds in the interval having the characterization PT;
- % UAT=the percentage seconds in the interval having the characterization UAT.

Then the PM processor (14) replaces the second and third rows in the performance log represented in FIG. 4, with a single merged record of poor time. The number of intervals of PT already in the performance log is now limited to four. This means that the interval of 2500 s of PT last detected can now be recorded in the performance log, without exceeding the limit of 5 intervals of PT in the performance log. This generates a performance log containing the information shown in FIG. 6.

This merging of two records into one, has reduced the number of records, however, the merged record still contains the most important information from the two records. Here we have one example of an intelligent way of limiting the size of the performance log, whilst decreasing the accuracy of the report by only a small amount.

A modification of this first example, is described next, in relation to FIG. 11. In this example the N longest intervals of perfect time $L_{PT1}, L_{PT2}, \ldots, L_{PTN}$ and the N longest intervals of unavailable time $L_{UAT1}, L_{UAT2}, \ldots, L_{UATN}$ are designated as primary records to be stored in the performance log [FIG. 11, boxes p, q, r, t, v, x]. Other records are designated as secondary records. The PM processor is then constrained to fill up the performance log with the following sequence of records:

$(I_1), L_1, (I_2), L_2, \ldots, (I_j), L_j$ for $j=1$ to $2N$ where
- $L_1, L_2, \ldots, L_j$ are primary records each made up of one of said N longest intervals, ie. records which fall within the set $L_{PT1}, L_{PT2}, \ldots, L_{PTN}$ or $L_{UAT1}, L_{UAT2}, \ldots, L_{UATN}$;
- and $(I_1),(I_2), \ldots,(I_j)$ are sequences of secondary records, possibly empty, falling between adjacent ones of said N longest intervals.

In the example of FIGS. 3 and 4, the records in the performance log would be designated, as follows:
- $(I_1)$ is empty
- $L_1$ is 6417; PT
- $(I_2)$ is 1; ES
- $L_2$ is 998; PT
- $(I_3)$ 7; SES
- $L_3$ 1002; PT
- $(I_4)$ is empty
- $L_4$ is 334; UAT
- $(I_5)$ is empty
- $L_5$ is 15644; PT
- $(I_6)$ is 6; ES and 7; SES
- $L_6$ is 24326; PT
- $(I_7)$ is empty
- $L_7$ is 24; UAT In the above example, $(I_1)$ is empty because the first record in the 24 hour period is of one of the N longest intervals of perfect time, which must be designated $L_1$ in accordance with the above rules. Also, $I_4$ is empty as there are no records between $L_3$ and $L_4$. $(I_5)$ and $(I_7)$ are similarly empty.

In this example, the data stored in a record for all intervals is the same regardless of the characterization of the signal quality for that interval and comprises only the duration of the interval and the quality characterization for that interval. The result of this is that the decision to merge is simplified, because all mergers of existing records will generate more space in the performance log. This would not be the case, for example where the records are of differing sizes and where two short records could be merged to form a record which is twice as long as a short record.

Figure 11:
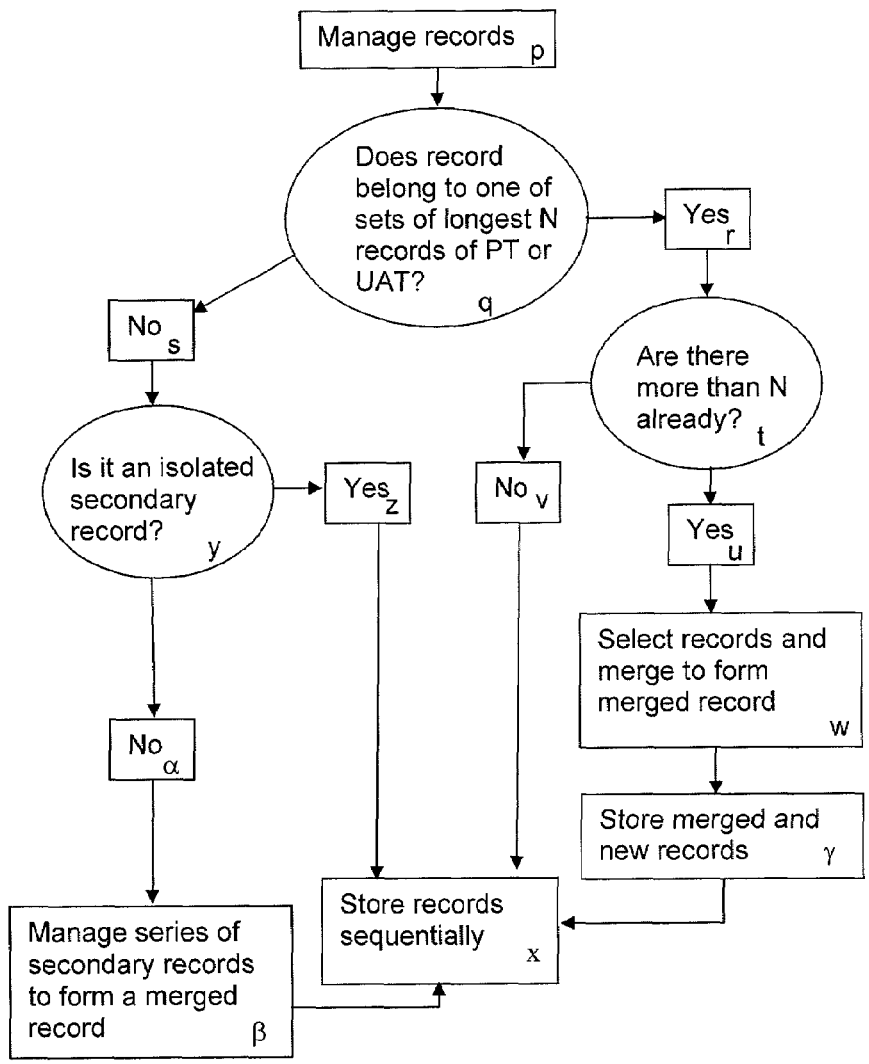
FIG. 11 shows a flow diagram of a first record merging process which can be implemented with the process of FIG. 10.

In this modification of the first example, all the $(I_j)$ are constrained so that they are made up of no more than one record [FIG. 11, boxes p, q, s, y, z, x]. So, if at any time the adding of a record to the performance log would lead to a portion of $(I_j)$ being made up of more than one record, the records making up the portion of $(I_j)$ are automatically merged to form a single PrT interval [FIG. 11, boxes p, q, s, y, α, β, x].

So in the example of FIGS. 3 and 4 after the record $L_5$ is 15644; PT is recorded in the memory (16) of FIG. 2, the PM processor (14) counts the six successive ES signals it receives from the bit error detector (12). After this the PM processor receives an SES signal from the detector. According to the present example, the PM processor (14) recognises that an SES signal is not eligible for recording as the $L_6$ record and so must be merged with the previously recorded ES count as part of the $(I_6)$ record. In this case the PM processor (14) stores the 6; ES count and counts the seven successive SES signals it then receives from the detector (12). Then the detector (12) sends a null signal to the PM processor, marking the beginning of the next period of PT. The PM processor recognises that a null signal is eligible for recording as the $L_6$ record. In response to this the PM processor (14) merges 6; ES record and 7; SES record to form the $(I_6)$ record, as follows:

6; ES

7; SES becomes

13; PrT and the record $(I_6)$ is stored in the memory (16).

Alternatively, the PM processor (14) may store the records 6; ES and the 7; SES records until a period when the processing capacity of the network element (2') is underutilized. This means that the merging of records may be done as a background process using only that processing capacity not required at that time for other purposes.

In the example of FIGS. 3 and 4, consider the case where after the $L_7$ record of 24; UAT at the end of the record in FIG. 4, a further, sixth, interval $L_8$ (($I_8$) would be empty) of 2500 s of PT is detected, followed by an interval of 6 s of ES. Because of the limit on the number of intervals of PT, which can be stored in the performance log, as there are already 5 intervals of PT stored in the performance log represented by FIG. 4, the PM processor (14) cannot store this latest record $L_8$ in the performance log, when the ES signal is received from the detector (12) marking the end of the 2500 s interval of PT.

The next step in this example is to remove the shortest one of the existing records $L_{PT}$ from the performance log along with its two adjacent ($I_j$) records. In the FIG. 3 example it is $L_2$=998; PT, ($I_2$)=1; ES and ($I_3$)=7; SES. These are merged into a new ($I_2$) record 1006; PrT. The subsequent records $L_3$ to $L_7$ are then renumbered as $L_2$ to $L_6$ and the new interval of 2500; PT is recorded in the performance log as $L_7$ (with the renumbered ($I_7$) empty) [FIG. 11, boxes p, q, r, t, u, w, y, x].

Using this modification of the first method, the performance log will contain a maximum number of records as follows:

$$(I_1), L_1, (I_2), L_2, \ldots, (I_{2N}), L_{2N}, (I_{2N+1})$$

Since the memory required by all records is the same, the maximum memory required to store the performance log using this method is $$(4N+1)M \qquad (2)$$

where

M is the amount of memory required to store one record.

Equation (2) above can be used to determine the largest possible value of N, which would result in less than the prescribed limit of memory being used for a 24 hour performance log.

Consider now a further modification, to the modified first example, in which the size of records relating to different signal quality characterizations are different. For example, PrT records could be longer than other records. Then records would only be merged if a further criteria is met, namely, that the amount of memory required to store the record resulting from the merging would be less than that required to store the records to be merged. A disadvantage with this method as compared with the previously described one is that more memory is required for a predetermined value of N and more processing is required to test whether a merging of records should take place and to carry out such a merging of records. The advantage is that a richer record of poor time is provided.

The maximum memory required to store the performance log using this method is $$(2N)M + (2N+1)P \qquad (2)$$

where

M is the amount of memory required to store a non-PrT record; and

P is the amount of memory required to store a PrT record.

In the first example of limiting the size of the performance log, complete accuracy of the performance log is lost as soon as a sixth interval of PT or UAT is detected, which may be as early as 11 records into the performance log. In the modifications of the first example, complete accuracy of the performance log is lost even earlier than this. If the first and second records to be recorded in a performance log in a 24 hour period do not include perfect time or unavailable time, then these first two records will be merged, before any further records are made. However, these disadvantages are weighed against the advantage that data processing to merge records can be carried out as a background processing activity, during periods in which the data processing capacity of a network element is under utilized. This means that during peak periods of data processing within the network element, little or no processing space needs to be taken up with generating the performance log.

The process shown in FIG. 11 is represented in FIG. 10 by the manage records step [FIG. 10, box i]. For each identified interval the processor (20, 24) generates [FIG. 10, box h; FIG. 11, box p] a new record. The processor then decides [box q] whether the new record belongs to one of the sets of the longest N records of PT or UAT, ie. is the new record a primary record. If the decision is 'yes—the new record is a primary record', [box r], then the processor makes a further decision as to whether there are now more than the predetermined limit N of primary records [box t]. If the decision is 'no—there are less than or equal to N primary records' [box v], then the new record is stored in sequence in the performance log [box x]. If the decision is 'yes—there are N primary records already', [box u], then the processor (20, 24) selects a set of successive records including the shortest of the already generated primary records (generally by recovering records from the performance log [FIG. 10, box o]) and merges the selected records to form a merged record of poor time [box w], which merged records is designated as a secondary record. The record of poor time and the new record are then stored sequentially in the performance log [boxes γ and x]. Going back to decision box q of FIG. 11, if the decision is 'no—the new record is a secondary record' [box s], then the processor (20, 24) determines whether the new record is an isolated secondary record [box y], ie. a single secondary record between two primary records. If the processor determines 'yes—the new record is an isolated secondary record' [box z], then the new record is stored sequentially in the performance log [box x]. If the processor determines 'no—the new record is part of a successive sequence of secondary records', [box α], then the processor selects the secondary records making up this sequence and merges then to form a merged record [box β]. The processor then stores the merged record sequentially in the performance log [box x].

Figure 12:
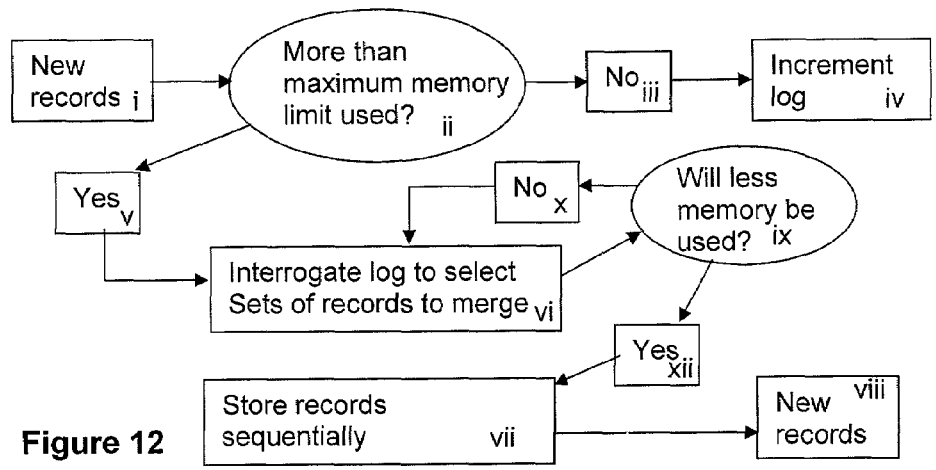
FIG. 12 shows a flow diagram of a second record merging process which can be implemented with the process of FIG. 10.

A second example of limiting the size of the performance log is to fill the log without carrying out any merging of records until the performance log fills up to a predetermined threshold, as summarized in FIG. 12. Part of FIG. 12 represents the manage records box i, of FIG. 10. On generating a new record [FIG. 10, box h, FIG. 12, box i], the processor (20, 24) determines whether more than a maximum memory limit has been used [box ii]. If the answer is 'no—the maximum limit has not been exceeded' [box iii], then the performance log [FIG. 10, box n] is incremented by the new record [box iv], ie. the new record is sequentially added to the performance log. If the answer is 'yes—the maximum limit is exceeded' [box v], then the processor (20, 24) interrogates the performance log held in memory (16) [FIG. 10, box o; FIG. 11, box vi] to select a set of sequential records to merge. The processor (20, 22) then determines whether the merging of the records will generate a merged record occupying less memory that the records selected for merging [box ix]. If it is determined 'yes—less memory will be used', [box xii], then the processor merges the selected records [box vii] and the processor (20, 24) amends the performance log [FIG. 10, box n] to replace the selected records with the new merged record [box viii], so the merged record is stored sequentially in the performance log (ie. in accordance with the sequence of time intervals to which the merged records relate). If it is determined 'no—more memory will be used', [box x], then the log is interrogated again to identify a different set of records to merge [box vi].

For example, the performance log might be filled until there is only space for 5 more records in the performance log for the current 24 hour period. As soon as this situation occurs, which is shown in the performance log represented by FIG. 4, merging of records is implemented to make room for more records. Again, consider the case where after the 24 seconds of UAT at the end of the record in FIG. 4, a further, sixth, interval of 2500 s of PT is detected, followed by a interval of 6 s of ES. In the current example, the merging of records is implemented when the PM processor (14) receives the first ES signal from the detector (12) marking the end of the 2500 s interval of PT, because the PM processor cannot record the record of the 2500 s PT in the performance log, as this would mean filling up one of the last 5 records in the performance log.

The records selected for merging might be selected as those adjacent records relating to an interval having the highest density of changes of signal quality. This density for a sequential number of x intervals is measured as follows:

$$x/\text{sum of durations of the x intervals} \qquad (1)$$

Using this criteria, the records in the second to fourth rows of the performance log of FIG. 4 would be selected for merging into a poor time record. This is because four changes of quality (first change=PT to ES at 6417 s; second change=ES to PT at 6418 s; third change PT to SES at 7416 s; fourth change SES to PT at 7423 s) occur in 1006 seconds so giving a high density of changes. According to equation (1) above, the density for the three sequential records making up the second to fourth rows of FIG. 4, is 3/1006. Thus, the PM processor extracts the following three records from the second to fourth rows of the performance log represented in FIG. 4:

Duration=1; Quality=ES;

Duration=998; Quality=PT; and

Duration=7; Quality=SES

And merges them to form a single record, formatted as follows:

Duration=1006; Quality=PrT; % PT=99.2; % UAT=0

Then the PM processor (14) replaces the second to fourth rows in the performance log represented in FIG. 4, with a single merged record of poor time, to generate a performance log represented by FIG. 7. There are now seven rows of records left free and so that the interval of 2500 s PT currently detected can be recorded in the performance log, without using one of the last 5 records in the performance log. In selecting the records for merging, sufficient records must be selected so that enough memory is reclaimed to make space for a new record to be added to the log.

Again, this merging of three records into one, has reduced the number of records, however, the merged record still contains the most important information from the three records. Here we have another example of an intelligent way of limiting the size of the performance log, whilst decreasing the accuracy of the report by only a small amount.

When only 5 records are left, an alternative criteria for merging records is to select the two adjacent records having the shortest sum of their durations. Using this criteria, the records in the eighth and ninth rows of the performance log would be selected for merging into a poor time record. Thus, the PM processor extracts the following two records from the eighth and ninth rows of the performance log represented in FIG. 4:

Duration=6; Quality=ES; and

Duration=7; Quality=SES; and

And merges them to form a single record, formatted as follows:

Duration=13; Quality=PrT; % PT=0; % UAT=0

Then the PM processor (14) replaces the eighth and ninth rows in the performance log represented in FIG. 4, with a single merged record of poor time, to generate a performance log represented by FIG. 8. There are now six rows of records left free and so that the interval currently detected can be recorded in the performance log, without using one of the last 5 records in the performance log.

It should be noted that there are a variety of criteria for selecting those records to be merged when a log is nearly full, which will be apparent to a person skilled in the art.

This second example of limiting the size of the performance log when only 5 records remain, has the advantage of maintaining complete accuracy of the performance log until it becomes nearly full, so that a completely accurate performance log is generated as often as possible. However, it has a disadvantage of the data processing required to merge records all occurring at the same time, ie. after all but the last 5 records are recorded. Once this stage is reached, for each one or two new records to be recorded a further merging process has to be carried out. This can be a problem when data processing to merge records coincides with peak periods of data processing within the network element in which processing capacity is limited.

Where a series of very short intervals occur, for example, where insufficient processing time is available to adequately process the intervals into records in the performance log, it is possible for these intervals to be stored in a panic store. Under these conditions all intervals in the panic store are then stored in the performance log as a single PrT interval. This is based on the assumption, that if the intervals are very short, then they are unlikely to be among the N longest PT or UAT.

Poor time may be defined to have two flavours, as follows:
ESPrT—an interval of PrT containing a mixture of PT and ES, but no SES or UAT;
SESPrT—an interval of PrT containing any SES (including UAT) and so SESPrT can contain a mix of any PT, UAT, EST or SEST.

Separating PrT into two flavours in this way is of value in generating a performance log which is useful in determining levels of service provided in different intervals. This is because in a period of ESPrT there will be no service failure, whereas in a period of SESPrT there will be a service failure.

The records collected for each interval of time, regardless of the quality characterization of the interval, may simply record duration and quality, ie. a record is represented as Duration=T; Quality=W;

where
T=number of second making up the interval; and
W=PT, UAT, ES, SES, PrT, ESPrT or SESPrT, etc.

Alternatively, the records collected for each interval of time, may be more complex. A more complex record is particularly valuable for periods pf poor time, whatever the flavour. Therefore, a method of performance logging according to the present invention may be envisaged in which the intervals of time which are not poor time are simply recorded as a duration and a quality, whereas, the intervals of poor time are recorded as more data than just duration and quality. This means that records of PrT may have a longer bit length than records of other types of time. For example, the data collected and making up a record of PrT may be anything from just duration and quality to an example such as:

Duration
Quality
ES count
SES count
UAT total
Longest PT interval
Longest ES interval
Longest SES interval
% PT For example, the data collected and making up a record of ESPrT might include:

Duration
Quality
ES count
Longest PT interval
Longest ES interval
% PT

And the data collected and making up a record of SESPrT might include:

Duration
Quality
SES count
UAT total
Longest PT interval
Longest ES interval
Longest SES interval
% PT In the simplest case, when all records just record duration and the characterization of signal quality of an interval, merging of records will generally mean adding up the durations of the records and characterizing the resultant merged record as PrT. Where PrT records are more than twice as long as other types of records, records should only be merged when the resultant PrT record uses less memory than the records merged to make that PrT record.

To give an example of a more complicated case, imagine the merging of the following five records:

$PT_1$
Duration=$d_1$
$ES_2$
Duration=$d_2$
$PT_3$
Duration=$d_3$
$ESPrT_4$
Duration=$d_4$
ES count=$e_4$
Longest PT interval=$PTlong_4$
Longest ES interval=$ESlong_4$
% PT=% $PT_4$
$UAT_5$
Duration=$d_5$ Then the resultant merged record would be:

SESPrT
Duration=$d_1+d_2+d_3+d_4+d_5$
ES count=$d_2+e_4$
SES count=0
UAT total=$d_5$
Longest PT interval=max($d_1,d_3$, $PTlong_4$)
Longest ES interval=max($d_2$, $ESlong_4$)
Longest SES interval=0
% PT=$(d_1+d_2+(\% PT_4 \times d_4/100))/(d_1+d_2+d_3+d_4))\times 100$ As well as the examples given above of how to characterize intervals, such as PT, UAT, ES, SES, PrT, etc. other examples may be of use and will be apparent to a person skilled in the art. For example, an interval of Toggling Time (TT), which could capture data describing a regularly toggling oscillating defect succinctly.

It should be further noted that it is not necessary to record the start time of an interval, as the start time of an interval can easily be deduced from the start time of the period and the accumulated duration of all recorded intervals prior to the one of interest. The start time could be calculated from the data in the performance log and then displayed for each interval in response to a user querying the performance log details for any 24 hour period.

Typically a performance log might be made up of 32 records (only 16 are shown for simplicity in the Figures) and each record might be of the same maximum length, for example, 32 bits.

As indicated above, each record may be selected to have a length of 32 bits. An example of such a record is shown in FIG. 9. The first 3 bit block of the record (A) can be designated for storing the block type, ie. PT, ES, SES, UAT, PrT, etc. The next 17 bit block can be used to store the duration of the record in seconds, ie. the number of successive signals counted from the detector (12) making up the record. Where the record is of PrT, the next 3 bit block can be used to store the percentage of PT making up the record and the following 3 bit block can be used to store the percentage of UAT making up the record. The block E could be used to store any other data that might be required for a Poor Time interval.

When the performance monitoring system according to the present invention itself fails for a period of time, signals are still carried over the communications paths. However, the defects in these signals will not be monitored. When the monitoring system starts to work once more, it is proposed that a new record is recorded in accordance with the present invention, after the last existing record in the current performance log, but that a flag is set to indicate that information may have been lost between the new record and the one preceding it. The time at which monitoring resumed could also be stored with the lost information flag, so that the duration of time during which no monitoring occurs can be deduced.

The present invention, as described above can provide a better quality of information in a performance log for the assessment of quality of service provided and for the troubleshooting of defects. Fewer secondary alarms need to be generated, making it easier and cheaper for network operators to focus on fixing networks. The attendant risk of network outage caused by having too many alarms is alleviated so that critical problems are addressed promptly and are not missed. The performance logs generated can provide an appropriate level of detail enabling network operators to 'prove' the service level agreements with their customers have not been violated.

The above describes the method of merging records in order to gradually degrade the accuracy of a performance log in an intelligent way so as to limit the size of the performance log. Other methods, apparent to the person skilled in the art can also be used to limit the size of the performance log. One example would be to identify patterns in the records stored in the log and to store data relating to the pattern, which could be used to recreate the log.

The invention claimed is:

1. A method of performance monitoring in a communications network, comprising;

monitoring a signal over time by allocating a current signal quality characterization to the signal, selected from at least three such signal quality characterizations;

identifying a plurality of time intervals making up a continuous succession of such time intervals, such that a current time interval is terminated and a next time interval is initiated each time the signal quality characterization allocated to the signal changes; and generating a record of each identified time interval, wherein the at least three signal quality characterizations are selected from the following:

Perfect Time Interval (PT), which is allocated to the signal where no errors are detected on the signal;

Errored Time Interval, which is allocated to the signal where errors are detected on the signal in a unit time in insufficient numbers to make a service carried by the signal unavailable;

Severely Errored Time Interval, which is allocated to the signal where errors are detected on the signal in a unit time in sufficient numbers to make a service carried by the signal unavailable;

Unavailable Time Interval (UAT), which is allocated to the signal where a service carried by the signal is unavailable; and Poor Time Interval (PrT), which is allocated to the signal where a sequence of at least two of the above characterizations are detected on the signal.

2. A method according to claim 1 additionally comprising generating a performance log using the records.

3. A method according to claim 1 wherein monitoring occurs over successive log periods and the method comprises generating a performance log using the records for each log period.

4. A method according to claim 1 wherein the record for each interval comprises at least the length of the interval and the signal quality characterization allocated for the interval.

5. A method according to claim 1 comprising generating a performance log made up of records stored in accordance with the succession of time intervals.

6. A method according to claim 1 comprising generating a performance log by manipulating selected records to reduce the amount of memory required to store the records while intelligently degrading their accuracy.

7. A method according to claim 1 additionally comprising selecting sets of records corresponding to continuous successions of time intervals, and merging the selected sets to form a merged record.

8. A method according to claim 1 additionally comprising:
designating some records as primary records and others as secondary records;
selecting sets of secondary records corresponding to continuous successions of time intervals; and
merging the selected sets to form a merged record.

9. A method according to claim 1 additionally comprising:
designating records as primary records if they fall within one or more sets of the longest records having a selected quality characterization and designating other records as secondary records;
selecting sets of secondary records corresponding to continuous successions of time intervals; and
merging the selected sets to form a merged record.

10. A method according to claim 1 additionally comprising:
designating some records as primary records and others as secondary records;
selecting sequences of secondary records corresponding to continuous successions of time intervals which are located between two primary records; and
merging the selected sets to form a merged record.

11. A method according to claim 1 additionally comprising: designating some records as primary records and others as secondary records;
selecting sets of secondary records corresponding to continuous successions of time intervals; and
merging the selected sets to form a merged record;
wherein secondary records are designated as such according to one or more of the following:
records representing the shortest intervals of time; and
records corresponding to the highest densities of continuous successions of time intervals.

12. A method according to claim 1 additionally comprising monitoring the amount of memory required to store the records, and when the amount of memory reaches a predetermined limit, selecting sets of records corresponding to continuous successions of time intervals, and merging the selected sets to form a merged record so as to reduce the amount of memory required to store the records.

13. A method according to claim 1 additionally comprising:
designating some records as primary records and others as secondary records;
selecting sets of secondary records corresponding to continuous successions of time intervals;
merging the selected sets to form a merged record; and
storing primary records, unmerged secondary records and merged records in a performance log according to the succession of their associated time intervals.

14. A method according to claim 1 additionally comprising merging selected records to form a merged record with a quality characterization of poor time and a duration equal to the sum of the duration of the intervals associated with the merged records.

15. A method according to claim 1 additionally comprising selecting a set of records corresponding to a continuous succession of time intervals and merging the selected set to form a merged record provided the memory required to store the merged record is less than the memory required to store the selected set of records.

16. A programmed computer, which stores computer executable program code for making the computer execute the method of claim 1.

17. A computer readable medium having computer executable software code stored thereon, which code is for making a computer execute the method of claim 1.

18. A processor for carrying out performance monitoring in a communications network, wherein the processor comprises:
an input for receiving an incoming signal to which performance monitoring is to be applied;
an input for receiving a clock signal; and
processing means for carrying out the following instructions:
monitor a signal over time by allocating a current signal quality characterization to the signal, selected from at least three such signal quality characterizations;
identify a plurality of time intervals making up a continuous succession of such time intervals, such that a current time interval is terminated and a next time interval is initiated each time the signal quality characterization allocated to the signal changes; and
generate a record of each identified time interval, wherein the at least three signal quality characterizations are selected from the following:

Perfect Time Interval (PT), which is allocated to the signal where no errors are detected on the signal;

Errored Time Interval, which is allocated to the signal where errors are detected on the signal in a unit time in insufficient numbers to make a service carried by the signal unavailable;

Severely Errored Time interval, which is allocated to the signal where errors are detected on the signal in a unit time in sufficient numbers to make a service carried by the signal unavailable;

Unavailable Time Interval (UAT), which is allocated to the signal where a service carried by the signal is unavailable; and Poor Time Interval (PrT), which is allocated to the signal where a sequence of at least two of the above characterizations are detected on the signal.

19. A processor according to claim 18 which is located in a network element of the communications network.

20. A processor according to claim 18 for monitoring a communications path and which is located in a network element of the communications network, which network element terminates the communications path.

21. A processor according to claim 18 wherein the processing means is additionally configured for generating a performance log in a memory using the records.

22. A processor according to claim 18 wherein the processing means is configured for monitoring the signal over successive log periods and for generating a performance log using the records for each log period.

23. A processor according to claim 18 wherein the processing means is configured for generating a record for each interval which comprises at least the length of the interval and the signal quality characterization allocated for the interval.

24. A processor according to claim 18 wherein the processing means is configured for generating a performance log made up of records stored in accordance with the succession of time intervals.

25. A processor according to claim 18 wherein the processing means is configured for generating a performance log by manipulating selected records to reduce the amount of memory required to store the records while intelligently degrading their accuracy.

26. A processor according to claim 18 wherein the processing means is configured for selecting sets of records corresponding to continuous successions of time intervals, and merging the selected sets to form a merged record.

27. A processor according to claim 18 wherein the processing means is additionally configured for carrying out the following:

designating some records as primary records and others as secondary records;

selecting sets of secondary records corresponding to continuous successions of time intervals; and merging the selected sets to form a merged record.

28. A processor according to claim 18 wherein the processing means is additionally configured for carrying out the following:

designating records as primary records if they fall within one or more sets of the longest records having a selected quality characterization and designating other records as secondary records;

selecting sets of secondary records corresponding to continuous successions of time intervals; and merging the selected sets to form a merged record.

29. A processor according to claim 18 wherein the processing means is additionally configured for carrying out the following:

designating some records as primary records and others as secondary records;

selecting sequences of secondary records corresponding to continuous successions of time intervals which are located between two primary records; and merging the selected sets to form a merged record.

30. A processor according to claim 18 wherein the processing means is additionally configured for carrying out the following:

designating some records as primary records and others as secondary records;

selecting sets of secondary records corresponding to continuous successions of time intervals; and merging the selected sets to form a merged record;

wherein secondary records are designated as such according to one or more of the following:

records representing the shortest intervals of time; and records corresponding to the highest densities of continuous successions of time intervals.

31. A processor according to claim 18 wherein the processing means is additionally configured for monitoring the amount of memory required to store the records, and when the amount of memory reaches a predetermined limit, selecting sets of records corresponding to continuous successions of time intervals, and merging the selected sets to form a merged record so as to reduce the amount of memory required to store the records.

32. A processor according to claim 18 wherein the processing means is additionally configured for merging selected records to form a merged record with a quality characterization of poor time and a duration equal to the sum of the duration of the intervals associated with the merged records.

33. Control logic configured for carrying out performance monitoring in a communications network wherein the control logic comprises:

an input for receiving an incoming signal to which performance monitoring is to be applied;

an input for receiving a clock signal; and logic means for carrying out the following instructions;

monitor a signal over time by allocating a current signal quality characterization to the signal, selected from at least three such signal quality characterizations;

identify a plurality of time intervals making up a continuous succession of such time intervals, such that a current time interval is terminated and a next time interval is initiated each time the signal quality characterization allocated to the signal changes; and generate a record of each identified time interval, wherein the at least three signal quality characterizations are selected from the following:

Perfect Time Interval (PT), which is allocated to the signal where no errors are detected on the signal;

Errored Time Interval, which is allocated to the signal where errors are detected on the signal in a unit time in insufficient numbers to make a service carried by the signal unavailable;

Severely Errored Time Interval, which is allocated to the signal where errors are detected on the signal in a unit time in sufficient numbers to make a service carried by the signal unavailable;

Unavailable Time Interval (UAT), which is allocated to the signal where a service carried by the signal is unavailable; and Poor Time Interval (PrT), which is allocated to the signal where a sequence of at least two of the above characterizations are detected on the signal.

34. Control logic according to claim 33 which is located in a network element of the communications network.

35. Control logic according to claim 33 for monitoring a communications path and which is located in a network element of the communications network, which network element terminates the communications path.

36. A network element for carrying out performance monitoring in a communications network comprising;

processing means for monitoring a signal over time by allocating a current signal quality characterization to the signal, selected from at least three such signal quality characterizations; and processing means for identifying a plurality of time intervals making up a continuous succession of such time intervals, such that a current time interval is terminated and a next time interval is initiated each time the signal quality characterization allocated to the signal changes; and processing means for generating a record of each identified time interval, wherein the at least three signal quality characterizations are selected from the following:

Perfect Time Interval (PT), which is allocated to the signal where no errors are detected on the signal;

Errored Time Interval, which is allocated to the signal where errors are detected on the signal in a unit time in insufficient numbers to make a service carried by the signal unavailable;

Severely Errored Time Interval, which is allocated to the signal where errors are detected on the signal in a unit time in sufficient numbers to make a service carried by the signal unavailable;

Unavailable Time Interval (UAT), which is allocated to the signal where a service carried by the signal is unavailable; and Poor Time Interval (PrT), which is allocated to the signal where a sequence of at least two of the above characterizations are detected on the signal.

37. A network element according to claim 36 for monitoring a communications path, which network element terminates the communications path.

* * * * *